(12) United States Patent
Chen et al.

(10) Patent No.: US 6,269,430 B1
(45) Date of Patent: Jul. 31, 2001

(54) METHOD FOR CONTROLLING A PROCESS OF WRITING DATA SENT BY A CENTRAL PROCESSING UNIT TO A MEMORY BY USING A CENTRAL PROCESSING UNIT INTERFACE

(75) Inventors: Chia-Hsin Chen, Taipei; You-Ming Chiu, Taipei Hsien; Jiin Lai, Taipei, all of (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/342,711

(22) Filed: Jun. 29, 1999

(30) Foreign Application Priority Data

Nov. 20, 1998 (TW) ............................................. 87119245 A

(51) Int. Cl.$^7$ .............................. G06F 12/00; G06F 13/00
(52) U.S. Cl. ......................... 711/154; 711/100; 711/104; 711/105; 365/203; 365/235
(58) Field of Search .................................. 711/3, 4, 104, 711/105, 154, 163, 100; 712/29; 365/203, 235

(56) References Cited

U.S. PATENT DOCUMENTS

| | | | |
|---|---|---|---|
| 4,939,695 | * 7/1990 | Isobe et al. ........................... | 365/222 |
| 5,440,716 | * 8/1995 | Schultz et al. ........................ | 711/114 |
| 5,649,160 | * 7/1997 | Corry et al. .......................... | 711/167 |
| 5,948,089 | * 9/1999 | Wingard et al. ...................... | 710/107 |

* cited by examiner

Primary Examiner—Tuan V. Thai
(74) Attorney, Agent, or Firm—Jiawei Huang; J.C. Patents

(57) ABSTRACT

A method for a CPU interface to control a writing process that writes data sent from a CPU to a memory. The CPU interface controls the writing process through steps mainly including receiving a write request and data from a CPU, sending a dummy request to the memory control circuit of the memory circuit, and then writing the data to a memory of the memory circuit. After the CPU interface receives a write request from the CPU, the CPU interface sends a dummy request to the memory control circuit to pre-charge and activate the designative memory page of the memory circuit before the data is sent to the memory circuit. Since the designative memory page is always pre-charged and activated while the data is received at the memory control circuit, the memory control circuit sends only a write command to the memory for writing the data to the memory without further pre-charging and activating the designative memory page. Therefore, the total number of clock cycles required for processing a write request is shortened.

9 Claims, 5 Drawing Sheets

METHOD FOR CONTROLLING A PROCESS OF WRITING DATA SENT BY A CENTRAL PROCESSING UNIT TO A MEMORY BY USING A CENTRAL PROCESSING UNIT INTERFACE

CROSS-REFERENCE TO RELATED APPLICATION

This application claims the priority benefit of Taiwan application serial no. 87119245, filed Nov. 20, 1998, the fill disclosure of which is incorporated herein by reference.

BACKGROUND OF THE INVENTION

1. Field of the Invention:

This invention relates to a method for controlling the process of writing data to a memory, and more particularly, to a method for controlling the process of writing data sent by a central processing unit (CPU) to a memory by using a CPU interface.

2. Description of Related Art:

The performance of a computer has been improved lately through a faster CPU and advances in other, associated components and peripherals. A random access memory (RAM), one of the major devices within a computer system for accessing data, and the method for controlling the memory circuit have also advanced to provide a faster data access. The RAM itself has been gradually improved in various forms, such as the dynamic RAM (DRAM), the fast page mode (FPM) DRAM, extended data out (EDO) DRAM, and the most recent, synchronized DRAM (SDRAM).

The schematic structural and functional connections between a CPU and a memory circuit in a conventional computer system are shown in FIG. 1.

Referring to FIG. 1, the memory circuit 140 includes a memory control circuit 122 and a memory 130 that further contains memory modules 131, 132, 133 and 134. While the computer is operating, the data and programs used by the CPU 110 are stored in the memory 130, which the CPU can access through a CPU interface circuit 121 and the memory control circuit 122. For most computers, the memory control circuit 122 and the CPU interface circuit 121 are normally built into one integrated circuit (IC), which is usually the chipset of a computer mainboard. The memory modules 131, 132, 133 and 134 are individually assembled onto the computer mainboard.

When the CPU 110 needs access to the memory 130, for reading or writing data, a certain control method is used to ensure that the request data are transferred correctly. A conventional method for controlling the access to the memory is illustrated by using a time-sequential diagram in FIG. 2.

In FIG. 2, the width of each longitudinal column represents the period of the system clock built in the computer. The transversal items of the time-sequential diagram represent the signals over different signal lines between the CPU and the memory of a computer system for handling memory access and data processing. The CCLK is the system clock signal. The $\overline{ADS}$, access request, is used by the CPU 110 for sending an access request, wherein either a read request or a write request is sent if the signal on the $\overline{ADS}$ is low. The DRDY, data ready, is used to confirm that the data currently transferred through the data bus are valid. The HD, host data, is used to transfer data toward and out from the CPU 110. The $\overline{DADS}$ carries a signal sent by the CPU interface 121 corresponding to the access request sent by the CPU 110. The SCMD consists of several signal lines for the memory control circuit 122 to send commands, such as activating a memory page or pre-charging a memory page, to a SDRAM 130. The MD, the memory data, is the data bus connected to the memory control circuit 122. The RSTB, the read strobe, confirm that the data read from the memory 130 are valid. The WSTB, the write strobe, shows that the data transferred by the MD is currently written to the memory 130.

Referring to FIG. 2 together with FIG. 1, CPU 110 sends out a read request 211 at time T1, and later on, sends out a write request 212 at time T4, both through the signal line $\overline{ADS}$, wherein both signals are received by the CPU interface 121. After the CPU interface 121 receives signal 211, it sends out a read request 241 to the memory control circuit 122 through the signal line $\overline{DADS}$. By executing the commands 251 sent through the signal line SCMD, the memory control circuit 122 provides requested data through the signal line MD in a latency of about two clock cycles. As shown in FIG. 2, there are four sets of requested data that are transferred to the CPU interface 121 through the signal line MD. The CPU interface 121 then sends the requested data to the CPU 110 through the signal line HD after another two clock cycles.

After the read request is executed completely, the CPU 110 sends out the data to be written to the memory 130 at the time T16 by using the signal line HD. After the CPU interface 121 receives the data, it sends a write request 242 to the memory control circuit 122 through the signal line $\overline{DADS}$. If the location where the data are to be written is not on the currently activated memory page, the memory control circuit 122 has to send commands through the signal line SCMD before the write request 254 is executed. The commands executed before command 254 include command 252, to pre-charge the desired memory page, and command 253, to activate the desired memory page.

According to the foregoing, the CPU interface 121 does not send out the write request 242 to the memory control circuit 122 until it receives data that are to be written. Once the memory control circuit 122 receives the write request 242 from the CPU interface 121, it has to execute commands 252 and 253 before it actually sends out the command 254, which actually writes data to the memory 130, if the desired memory location is not activated while the write request is received by the memory control circuit 122. Since a simple task, writing data to a memory location, takes about 9 clock cycles by using the conventional method, by which expanse of time the performance of the computer is obviously limited.

SUMMARY OF THE INVENTION

It is therefore an objective of the present invention to provide a method for controlling the writing process to reduce the writing latency.

It is another an objective of the present invention to provide a method for writing data sent by a central processing unit (CPU) to a memory through the control of a CPU interface to reduce the writing latency.

In accordance with the foregoing and other objectives of the present invention, the method of the invention allows a CPU interface to control the writing process, including receiving a write request and data from a CPU and then writing the data to a memory of a memory circuit. After the CPU interface receives a write request from the CPU, the CPU interface sends a dummy request to the memory control circuit to pre-charge and activate the designative memory page of the memory circuit before the data is sent to the memory circuit. Since the designative memory page is always pre-charged and activated while the data is received at the memory control circuit, the memory control circuit sends only a write commands to the memory for writing the data to the memory without further pre-charging and activating the designative memory page. Therefore, the total number of clock cycles required for processing a write request is shortened.

More specifically, the method of the invention starts with a write request that is sent from a CPU to a CPU interface, wherein the write request consists of address information and data information. The address information carries a designative memory address where the data are to be written. The data information contains a value equal to the length of the data to be written to the designative memory page. After the CPU interface receives the write request, it sends a dummy request to the memory control circuit of a memory circuit. The dummy request carries an address information exactly the same as that of the write request and a zero-value data information. While the data to be written is sent from the CPU to the CPU interface, the memory control circuit pre-charges and activates a designative memory page according to the address information within the dummy request. Hence, while the data is sent from the CPU interface to the memory circuit, the memory control circuit writes the data to the designative memory page directly.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a new method for controlling a writing process that writes data from a central processing unit (CPU) to a designative memory location through the control of a CPU interface. The schematic structural and functional connections between a CPU and a memory circuit in a computer system are shown in FIG. 1.

Figure 1:
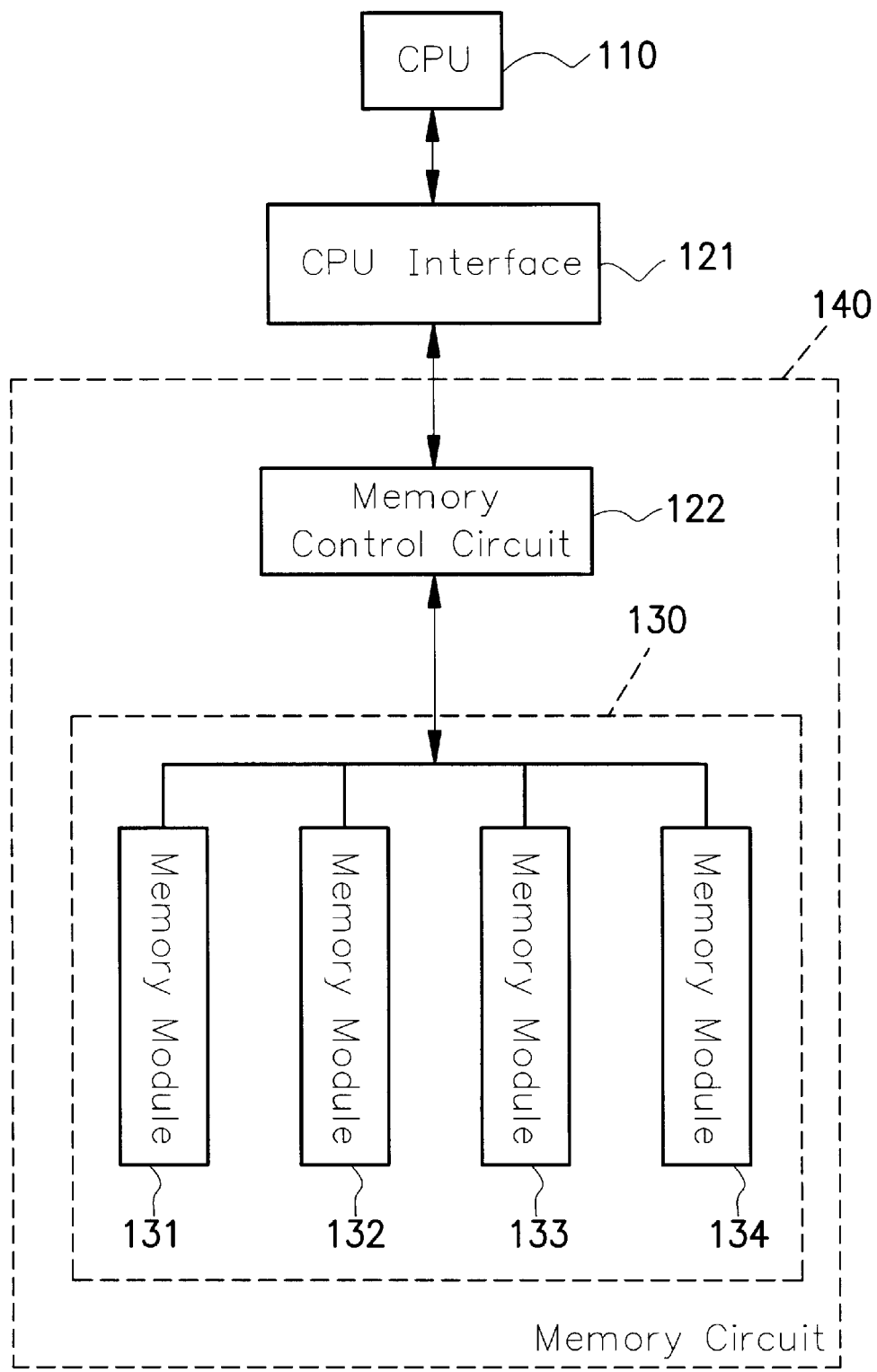
FIG. 1 is a schematic block diagram showing the partial architecture of a CPU and a memory circuit of a computer system.

Referring to FIG. 1, the memory circuit 140 includes a memory control circuit 122 and a memory 130 that further contains memory modules 131, 132, 133 and 134 for storing data and programs used by the CPU 110. The CPU can access the memory 130 through a CPU interface circuit 121 and the memory control circuit 122.

Figure 3:
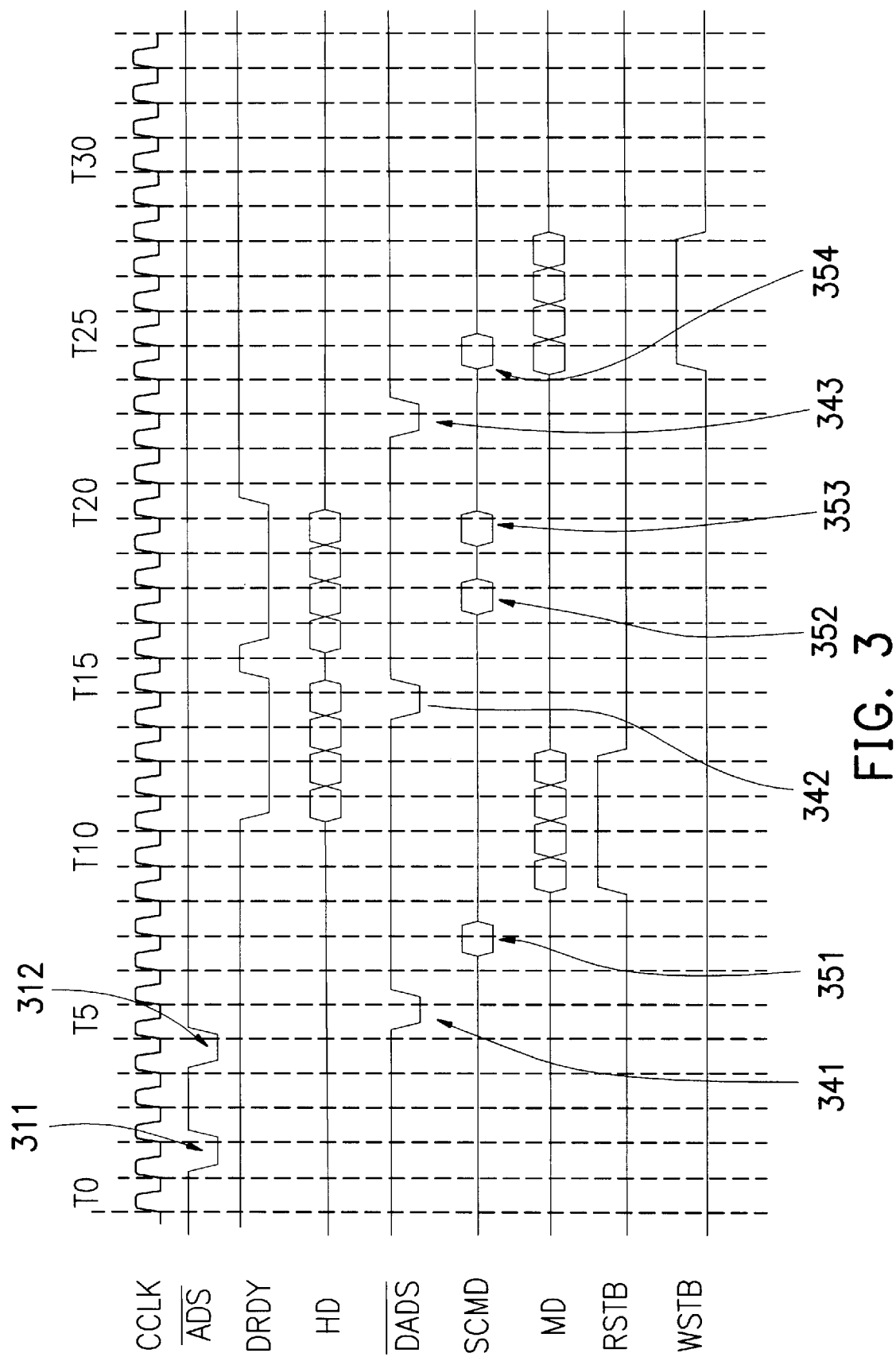
FIG. 3 is a time-sequential diagram showing the method for controlling a writing process that writes data from a CPU to a memory circuit in a preferred embodiment of the invention.

The method of the invention for the CPU interface 121 to control a process that writes data from the CPU 110 to the memory 130 is illustrated by the time-sequential diagram of FIG. 3.

Referring to FIG. 3, the width of each longitudinal column of the time-sequential diagram represents the period of the system clock built in the computer. The transversal items crossing the time-sequential diagram represent different signals over different signal lines for handling memory access and data processing between the CPU 110 and the memory 130. The signal line CCLK is the system clock signal. The signal line $\overline{\text{ADS}}$, access request, is used by the CPU 110 for sending an access request, wherein either a read request or a write request is sent if the signal carried by the $\overline{\text{ADS}}$ is low. The signal line DRDY, data ready, is used to validate the data currently transferred through the data bus. The signal line HD, host data, is used to transferring data toward and outward the CPU 110. The signal line $\overline{\text{DADS}}$ carries a signal sent by the CPU interface 121 correspondingly to the access request sent by the CPU 110. The signal line SCMD consists of several signal lines for the memory control circuit 122 to send commands, such as activating a memory page or pre-charging a memory page, to a synchronized dynamic random access memory (SDRAM) 130. The signal line MD, memory data, is the data bus connecting the memory control circuit 122 and the memory 130. The signal line RSTB, read strobe, validates the data read from the memory 130. The signal line WSTB, write strobe, shows the data transferred by the MD is currently written to the memory 130.

Referring to FIG. 3 together with FIG. 1, after the CPU 110 sends out a read request 311 at the time T1 and then sends out a write request 312 at the time T4 through the signal line $\overline{\text{ADS}}$; both signals are received by the CPU interface 121. Each data access request, either a read request or a write request, from the CPU 110 consists of an address information and a data information. The address information carries a memory address where the designative data are to be read from or written to. The data information then carries a value equal to the length of the designative data.

After the CPU interface 121 receives signals 311 and 312, it firstly sends out a read request 341 to the memory control circuit 122 through the signal line $\overline{\text{DADS}}$. On the assumption that the designative memory page, which contains the desired data, is currently activated, the memory control circuit 122 sends out the commands 351 through the signal line SCMD to the memory 130. After a latency of about two clock cycles, the memory control circuit 122 feeds requested data back to the CPU 110 through the signal line MD. As shown in FIG. 3, there are four sets of requested data that are transferred toward the CPU interface 121 through the signal line MD. The CPU interface 121 then sends the requested data to the CPU 110 through the signal line HD after another two clock cycles, at the beginning of T11.

After the desired data are completely sent out at T13, the memory 130 is ready for next task. Since the CPU 110 is still busy with receiving data retrieved from the memory 130, the CPU interface 121 send out a dummy request 342 to the memory control circuit 122 at T14. As other data access requests, the dummy request also consists of an address information and a data information, except the data information of the dummy request carries a value of zero. Because the address information of the designative memory location asked by the write request 312 is already received and stored by the CPU interface 121, it is then carried by the dummy request 342 and sent to the memory control circuit 122 before the designative data are even sent to the CPU interface by the CPU 110.

As soon as the memory control circuit 122 receives the dummy request 342, it first determines the status of the memory page that contains the designative memory location designated by the address information of the dummy request. In the case that the particular memory page is not currently activated, the memory control circuit 122 sends out commands 352 and 353 to the memory 130 at T17 and T19, respectively, to pre-charge and activate the particular memory page. The command 352 is a pre-charging command, and the command 353 is an activating command.

After the read request 311 is executed completely at T15, the CPU 110 sends out the data to be written to the memory 130 at the time T16 through the signal line HD.

After the CPU interface 121 receives the data, it sends an actual write request 343 to the memory control circuit 122 through the signal line $\overline{DADS}$. Since the memory control circuit 122 already pre-charges and activates the designative memory page by using the address information of the dummy request 342, it just sends out a write command 354 to the memory 130 at T24 for writing data to the designative memory location.

Figure 2:
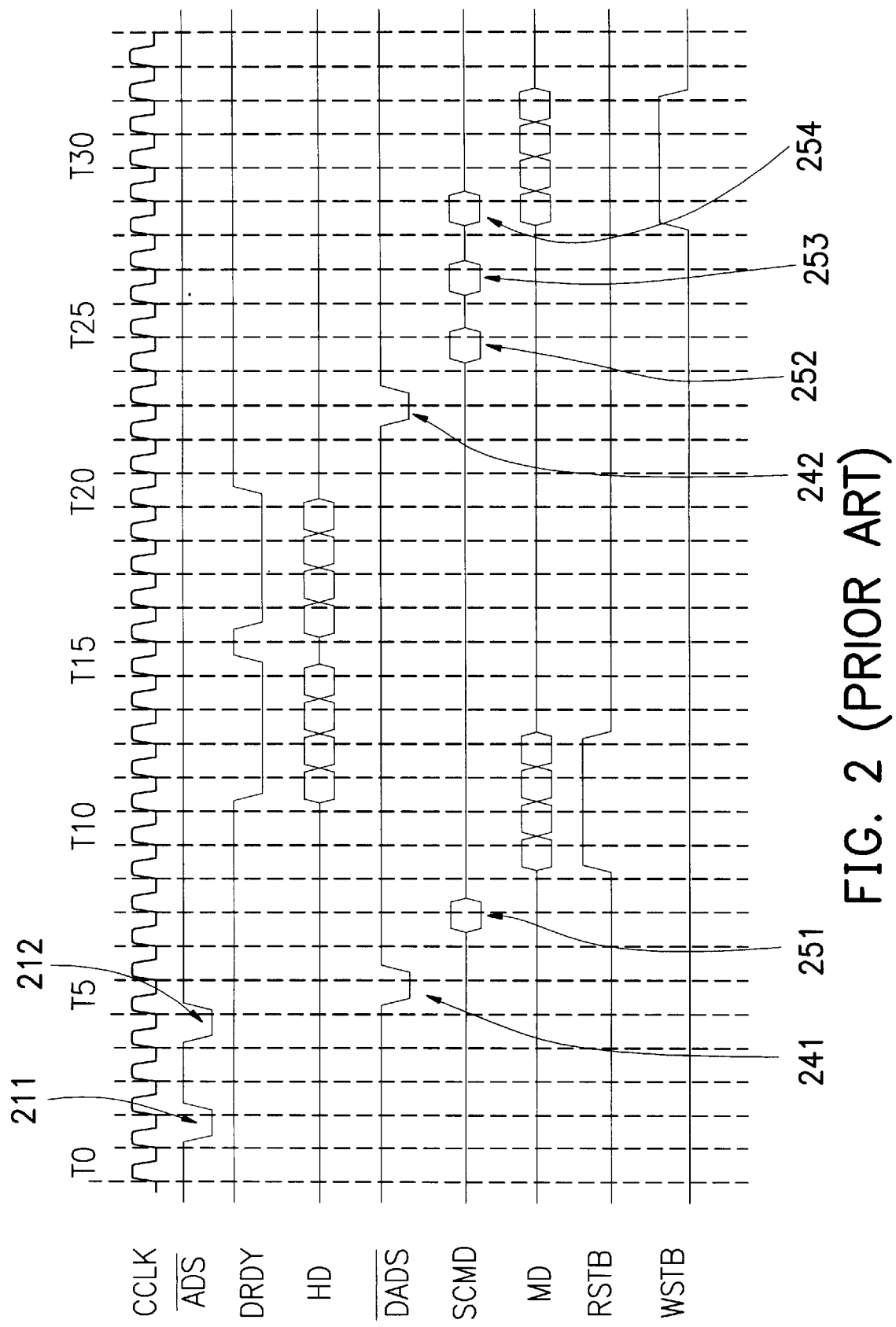
FIG. 2 is a time-sequential diagram showing a conventional method for controlling a writing process that writes data from a CPU to a memory circuit.

Apparently, the designative memory locations asked by two back-to-back requests, such as the read request 311 and write request 312, are possibly located on different memory pages in reality. According to the method of the invention, the CPU interface 121 is still capable of activating the memory page designated by the second request, the write request 312, by sending a dummy request to the memory control circuit 122 during execution of the first request, the read request 311. Hence, as soon as the first request is finished, the memory control circuit 122 writes the data to the designated memory location with shorter write latency. Compared with the write latency, 9 clock cycles, of the conventional method shown in FIG. 2, the write latency of the method according to the invention is only 5 clock cycles.

Figure 4:
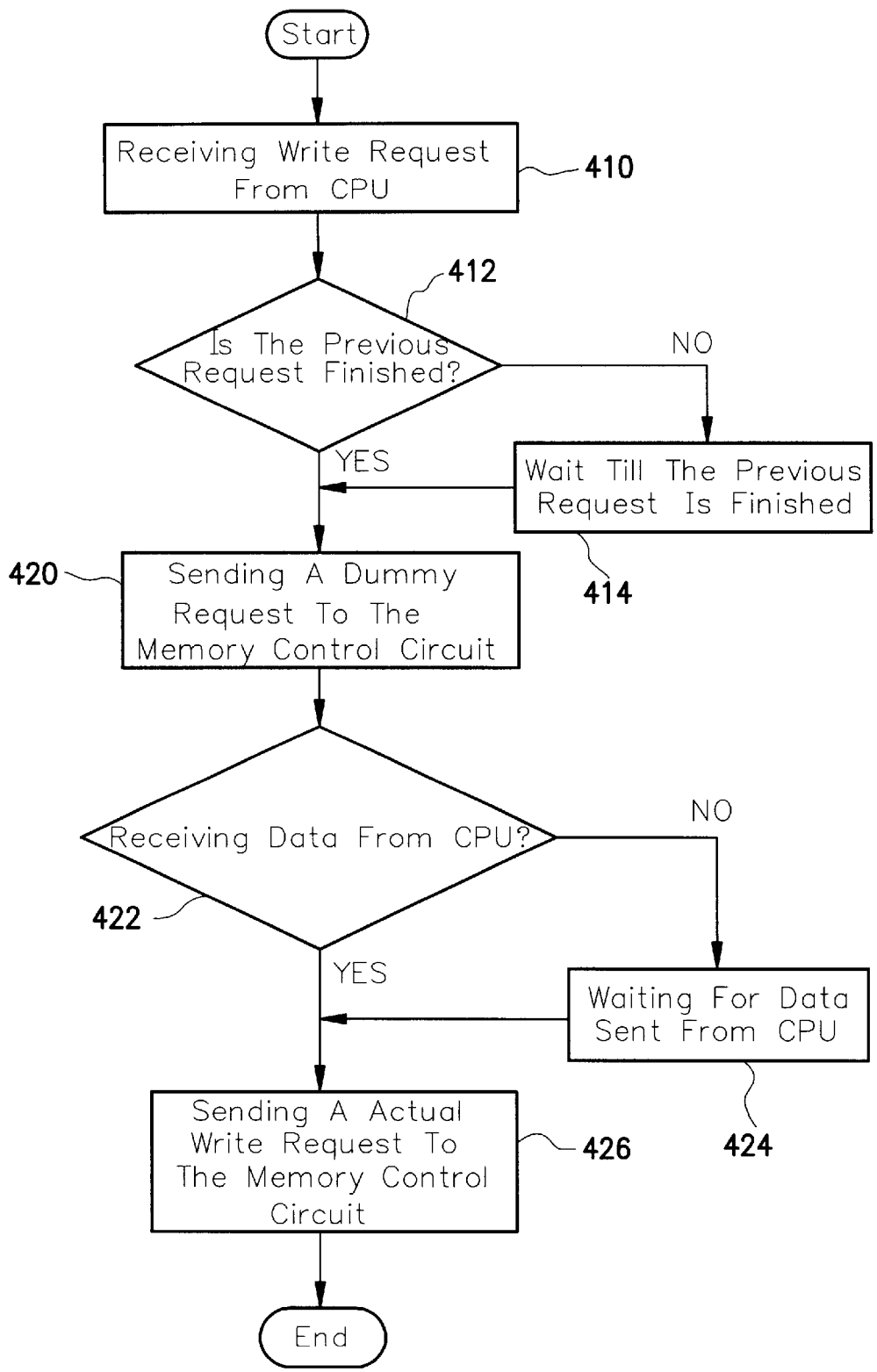
FIG. 4 is a flowchart showing the procedures of the CPU and the CPU interface in the method of the invention for controlling a writing process that writes data from a CPU to a memory circuit.
Figure 5:
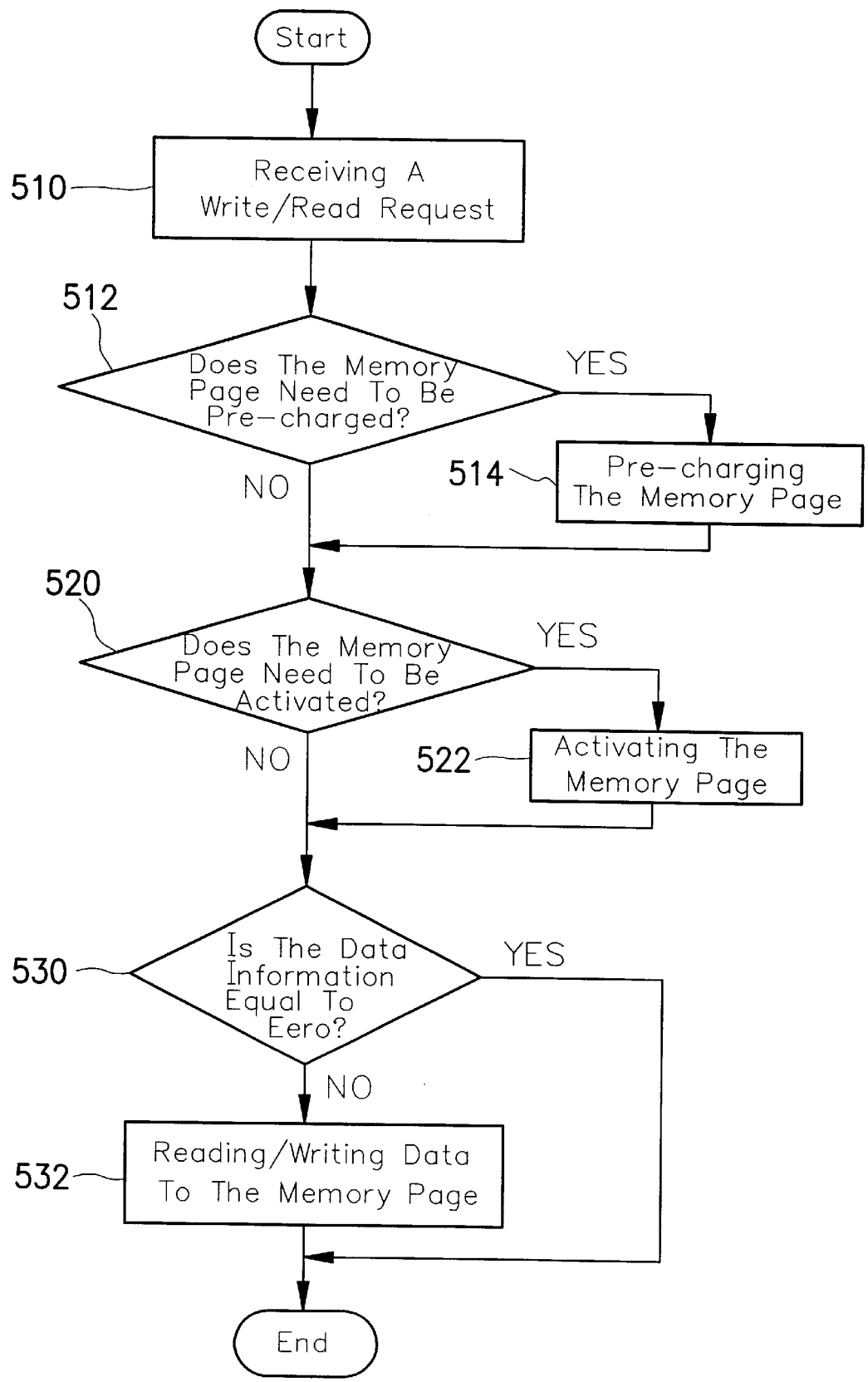
FIG. 5 is a flowchart showing the procedures of the memory control circuit in the method of the invention for controlling a writing process that write data from a CPU to a memory circuit.

The detail of the method according to the invention is illustrated by the flowcharts in FIGS. 4 and 5.

Referring to FIG. 4 together with FIGS. 1 and 3, after a CPU interface 121 receives a write request 312 from the CPU 110 in Step 410 to write data to a memory location, the CPU interface 121 performs a decision check in Step 412. If the memory circuit 130 is currently working on a previous request 311, the CPU interface 121 does not send the dummy request 342 to the memory control circuit 122 until the memory 130 finishes the previous request 311, in Step 414. Otherwise, the CPU interface sends the dummy request 342 to the memory control circuit 122, in Step 420. The write request 312 from the CPU 110 consists of an address information and a data information. The address information carries a memory address designating where the data are written, and the data information carries a value equal to the length of the data. The dummy request 342 consists of an address information and a data information as well. The address information the dummy request 342 are exactly the same as the address information of the write request 312, but the data information of the dummy request 342 only carries a value of zero.

In Steps 422 and 424, the CPU interface 121 waits for the CPU 110 to send out the data to be written to the memory 130. As soon as the CPU interface 121 receives the designative data from the CPU 110, it sends an actual write request 343 to the memory control circuit 122. The actual write request 343 carries exactly the same information as the write request 312. Then, the memory control circuit 122 gives a command 354 to the memory 130 to write the designative data to the designated memory location.

FIG. 5 is a flowchart describing the processes carried out by the memory control circuit 122. Even though the method of the invention is used mainly to improve the performance of a computer system by shortening the write latency, the method for controlling the data access to the memory circuit 140 is the same for either a writing process or a reading process. Therefore, the following description about the memory circuit 140, which includes the memory control circuit 122 and the memory 130 as shown in FIG. 1, is not specifically limited to a writing process.

Referring to FIG. 5 together with FIGS. 1 and 3, after the memory control circuit 122 receives a request from the CPU interface 121, it first determines the status of the memory page designated by the request. Just like the dummy request 342, the write request 312 and the actual write request 343, any data access request consists of an address information and a data information for indicating the designative memory location and the length of the designative data. In Steps 512 and 520, if the memory page designated by the request is not currently pre-charged or activated, the memory control circuit 122 then processes Step 514 and/or Step 522 to pre-charge and/or activate the designated memory page accordingly to the status of the designated memory page.

After the designated memory page is pre-charged and activated, in Step 530, the memory control circuit 122 now checks the data length information carried by the received request. If the data length information equals zero, which means the received request is a dummy request, the memory control circuit 122 stops and waits for the next request. If the data length information is a value other than zero, the memory control circuit 122 commands the memory 130 to process the requested data access task, either writing data to a designated memory location or reading designative data from the memory location, in Step 532.

The method of the invention for controlling a process of writing data sent from a CPU to a memory sends a dummy request from the CPU interface to the memory control circuit of a memory circuit after the CPU interface receives a write request from the CPU. The dummy request and the write request both carry address information and data length information, wherein the data length information carried by the dummy request equals zero. While the data to be written is sent from the CPU to the CPU interface, the memory control circuit pre-charges and activates a memory page designated by the address information within the dummy request. Therefore, while the data is sent from the CPU interface to the memory circuit, the memory control circuit directly writes the data to the designative memory page to reduce the write latency.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for controlling a process of writing a set of data sent by a central processing unit (CPU) to a memory page of a memory circuit by using a CPU interface, wherein the set of data is written to the memory page starting from an address, the method comprising steps of:

receiving a write request from the CPU, wherein the write request comprises the address and a data length information;

sending a dummy request to the memory circuit, wherein the dummy request comprises the address and a dummy data length information indicating a length of zero to prepare the memory page;

receiving the set of data from the CPU; and sending an actual write request to the memory circuit, wherein the actual write request comprises the data length information.

2. The method of claim 1, further comprising a step of:

processing the step of sending a dummy request when a memory access operation is currently performed at another memory page.

3. The method of claim 1, wherein the step of sending the dummy request further comprises a step of:

pre-charging and activating the memory page if the memory page is not currently activated.

4. The controlling method of claim 1, wherein the memory circuit comprises a plurality of synchronized dynamic random access memories.

5. The method of claim 1, wherein the step of sending the actual write request further comprises a step of:

writing the set of data to the memory address.

6. A method for controlling a process of writing a set of data sent by a central processing unit (CPU) to a memory page of a memory circuit by using a CPU interface, wherein the set of data is written to the memory page starting from an address, the method comprising steps of:

receiving a write request from the CPU, wherein the write request comprises the address and a data length information;

sending a dummy request to the memory circuit if the memory page is currently idle, wherein the dummy request comprises the address and a dummy data length information indicating a length zero to prepare the memory page receiving the set of data from the CPU; and sending an actual write request to the memory circuit, wherein the actual write request comprises the data length information.

7. The method of claim 6, wherein the step of sending the dummy request further comprises a step of:

pre-charging and activating the memory page if the memory page is not currently activated.

8. The controlling method of claim 6, wherein the memory circuit comprises a plurality of synchronized dynamic random access memories.

9. The method of claim 6, wherein the step of sending the actual write request further comprises a step of:

writing the set of data to the memory address.

* * * * *